Figure 1:
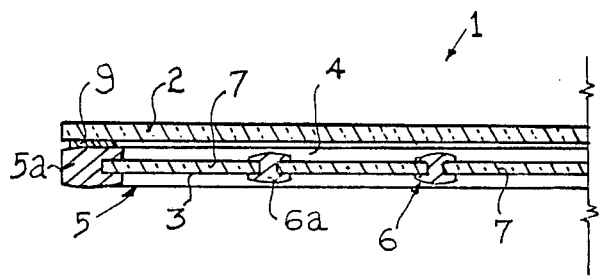

United States Patent [19]
Hickman

[11] Patent Number: 4,756,938
[45] Date of Patent: Jul. 12, 1988

[54] LAMINATION OF LEADED GLAZING PANELS

[76] Inventor: James A. A. Hickman, 14a Seaforth Drive, Edinburgh, Scotland, Scotland

[21] Appl. No.: 906,917

[22] Filed: Sep. 11, 1986

[51] Int. Cl.$^4$ .............................................. B32B 17/10
[52] U.S. Cl. ........................................ 428/38; 52/789; 156/63; 156/99; 156/100; 156/107; 264/261
[58] Field of Search .................... 52/788, 789; 156/63, 156/99, 100, 104, 107; 264/102, 261; 428/38

[56] References Cited

U.S. PATENT DOCUMENTS

| 2,020,178 | 11/1935 | Haas. | |
|---|---|---|---|
| 3,382,137 | 5/1968 | Schreiber et al. | 156/99 X |
| 3,460,303 | 8/1969 | Algrain et al. | 428/38 X |
| 4,299,639 | 11/1981 | Bayer | 156/104 |

FOREIGN PATENT DOCUMENTS

| 0056719 | 7/1982 | European Pat. Off. . |
| 1448184 | 8/1966 | France . |
| 2145636 | 2/1973 | France . |
| 80642 | 12/1978 | Luxembourg . |
| 1367977 | 9/1974 | United Kingdom . |
| 1424443 | 2/1976 | United Kingdom . |
| 1461255 | 1/1977 | United Kingdom . |
| 1516869 | 7/1978 | United Kingdom . |
| 2015427 | 9/1979 | United Kingdom . |
| 2032844 | 5/1980 | United Kingdom . |
| 2051659 | 1/1981 | United Kingdom . |
| 1600867 | 10/1981 | United Kingdom . |
| 2155856 | 10/1985 | United Kingdom . |

OTHER PUBLICATIONS

European Search Report for EP 86 30 7042, dated 4/5/87 (3 pp.).
UK Examiner's Search Report for 861777, dated Oct. 16, 1986 (2 pp.).

Primary Examiner—Robert A. Dawson
Attorney, Agent, or Firm—Michael J. Striker

[57] ABSTRACT

A method of producing a laminated or resin bonded glazing unit comprising introducing an exothermically setting liquid resin material between a pair of spaced apart glazing panels and allowing the resin material to set, wherein one of the glazing panels is a leaded, stained or decorative glazing panel.

14 Claims, 1 Drawing Sheet

LAMINATION OF LEADED GLAZING PANELS

This invention relates to a method of laminating or resin bonding together a first glazing panel to a leaded, stained or decorative second glazing panel and to a laminated or resin bonded, leaded, stained or decorative glazing unit produced by such a method. The invention also relates to a leaded, stained or decorative, multiple, e.g. double, glazing unit in which one of the panels is provided by a laminated or resin bonded, leaded, stained or decorative glass glazing unit.

A stained glazing or glass panel is normally constructed by staining or painting a large clear or coloured glass panel with colours to produce a desired design or picture, sometimes to effect a mock or imitation leaded type window design. Some stained glass panels can also be fired or heated to a given temperature and the colouring material or paint fused into the glass to provide a permanent stain. Some stained, coloured or painted panels are not fired or the colours fused, and these are more commonly referred to as imitation stained glass panels. Other techniques for producing imitation stained glass include screen printing, photostat printing and colour transfer printing.

A decorative glazing panel is normally considered to be a glazing panel which has a pattern or design, e.g. of pictorial matter, sandblasted, acid etched, screen printed, transfer printed or transferred in any other way thereon. Such decorative glazing panels may be produced with patterns, e.g. repetitive patterns, formed, e.g. sandblasted or printed, on one or both sides. Decorative panels decorated on both sides were originally generally of Italian origin but are now becoming more widely manufactured elsewhere. The term decorative glazing panel used in this specification is also intended to cover glass or non-glass ceramic type panels.

For example a glass ceramic panel is normally manufactured by fusing as a given temperature coloured or painted glass on to a clear, obscure or coloured flat panel to form a design-bearing or decorative glazing panel. A non-glass decorative ceramic panel can be formed in a similar manner.

A leaded glazing panel is normally considered to be a glazing panel, constructed of small panes of coloured or clear glass, built into lead cames, which hold each individual pane in position to form an overall pictorial scene or design.

A disadvantage of known leaded, stained or decorative glass or glazing panels is that they deteriorate in quality when exposed to the atmosphere, either because of the climatic elements and atmospheric conditions or because they become dirty and are difficult to clean. In addition such glazing panels are often not structurally strong, for example leaded glass is inherently weak due to its very method of construction in which separate pieces of glass are fitted into lead cames. Also it is difficult, at least with leaded glazing panels, to produce multiple, e.g. double, glazing units since the conventional glazing panela are not air-tight.

The present invention seeks to overcome one or more of the disadvantages referred to above associated with known leaded, stained or decorative glazing panels.

According to one aspect of the present invention a method of producing a laminated glazing unit comprises introducing an exothermically setting liquid resin material between a first glazing panel and a leaded, stained or decorative second glazing panel arranged in face-to-face relationship and sealed together around at least part of their peripheries in a liquid-tight manner and allowing the liquid resin material to set.

The present invention thus enables the production of a laminated leaded, stained or decorative glazed panel. Such glazed panels are desirable for a number of reasons. Firstly a first glazing panel laminated to a second, leaded, stained or decorative panel, serves to protect the second panel. For example when the first glazing panel is on the outside of a window it protects the second leaded, stained or decorative panel from climate elements and atmospheric pollution. Additionally some resin material will provide a complete barrier to the transmission of ultra violet light, which is vitally important to materials used in stained or leaded panels, which are affected by ultra violet light with subsequent loss of colour. Furthermore external cleaning of such a glazing unit is rendered much easier than is the case with an unlaminated panel, where the lead cames, stained glass or decorative design are exposed either externally or internally. For instance with unlaminated leaded glass, it is impossible to keep leaded panels adequately clean and as a result they suffer from gradual degradation of colour and clarity. Similar effects are experienced with unlaminated stained and decorative glasses to a greater or lesser degree depending on their site location. However laminating or resin bonding stained or decorative glazing panels, with the decorative or stained glass to the inner face of the lamination if the panel is only decorated or stained on one face or with laminating on both sides if the glazing panel is stained or decorated on both its sides, provides a total barrier against normal ensuing deterioration. Similarly with a laminated leaded glazing panel, the second glazing panel may be laminated on one face or on each side of the leaded panel, as desired for protecting the glazing unit. Finally the structural strength of a glazing panel can be greately improved by laminating. For example a laminated leaded glazing unit has far greater structural strength than an unlaminated unit which is inherently weak due to the very method of construction of fitting separate pieces of glass in lead cames. The laminating method of the invention thus enables much larger leaded panels to be manufactured and installed than normal, and will also prevent the gradual sagging of lead cames which deteriorate with time and therefore eliminate expensive leaded panel rebuilding costs. Similarly, stained and decorative panels are substantially strengthened by the laminating method to enable larger sizes to be used which comply with safety regulations and provide protection against physical abuse.

The exothermically setting liquid resin material is typically a methacrylate resin of low or high viscosity, as required, although other types of resin or resin based products, are also suitable for these applications. By way of example high viscosity resin is more suitable for laminating or resin bonding leaded panels. Methacrylate resins are particularly suitable since both low and high viscosity methacrylate resins can be made particularly clear, even with a greater clarity than glass itself, and are obtained by mixing, by hand or machine, catalysts with resin for subsequent dispensing by hand pouring or pressure injecting between the two faces, preferably with the panes in an inclined position for gravity filling. Methacrylate resins such as manufactured by Degussa AG, Frankfurt and Rohmn of West Germany are preferred for resin laminating because of their high quality, stability and clarity.

Preferably when the second glazing panel is a leaded glazing panel, the glazing unit is cooled during the setting of the liquid resin material. Such cooling is generally necessary when high ambient room temperatures occur, e.g. during the hotter summer months, but may not be required at other times, e.g. during the cooler winter months. Preferably the cooling of the glazing panels is controlled so that the temperature of each glazing panel does not exceed 27° C. Typically cooling of the glazing panels, continues for at least two hours, e.g. 4 hours, after the liquid resin material has been introduced between the glazing panels. Cooling of the glazing panels is preferably by means of gas, e.g. air, cooling although liquid, e.g. water, cooling is also possible. Depending on the design and size of the glazing panels used it is possible to cure the panels without cooling, although an element of risk of damage to the panels is involved.

If the second glazing panel is a leaded glazing panel it preferably comprises a number of glazing panes held together by lead cames. In this case, the glazing panes are preferably sealed, e.g. by transparent silicone material, against resin leakage prior to arranging the glazing panels in face-to-face relationship. It is possible, when a leaded glass panel is to be laminated, for a special cement or sealant to be used in the channels of the lead cames holding the glass to prevent air or resin leakage. The lead cames of the second glazing panel are suitably cleaned and primed with a suitable primer or bonding agent prior to the glazing panels being arranged in face-to-face relationship. This serves the purpose of ensuring that the peripheral seal (e.g. of silicone) and the resin material adhere to the lead cames. This is particularly important for ensuring good adhesion of the resin material to the lead during expansion and contraction which occurs during the curing of the resin material. The peripheral seal can suitably be formed by solid adhesive tape, silicone sealant or a combination of both although other suitable sealant or material, sufficient to prevent leakage, either with or without peripheral pressure may be provided for the peripheral seal.

According to another aspect of the present invention there is provided a laminated glazing unit made by the method of said one aspect of the invention.

According to a further aspect of the present invention a multiple, e.g. double, glazing unit comprises two spaced apart glazing panels defining a hermetically sealed cavity therebetween, one of said spaced apart glazing panels comprising a laminated glazing unit made by the method of said one aspect of the invention. Heretofore it has not been possible to produce a leaded double glazing unit because a hermetically sealed cavity could not be obtained because of the nature of known leaded or stained glass panels which were not airtight.

Figure 2:
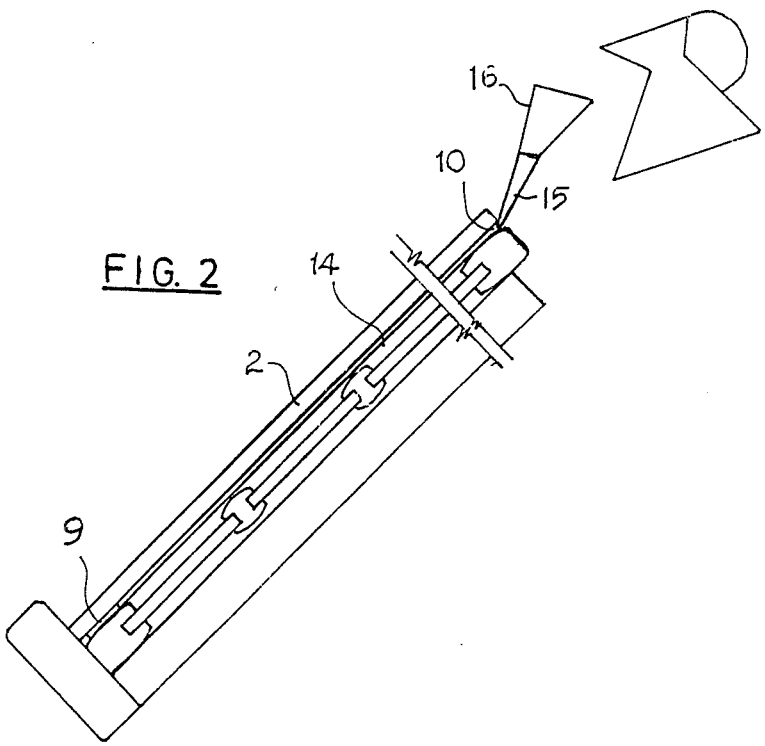
Figure 3:
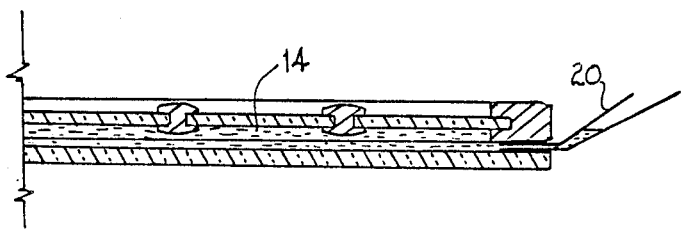

An embodiment of the invention will now be described, by way of example, with reference to the accompanying drawing, in which:

FIG. 1 is a partial sectional view of a laminated leaded glazing unit according to the invention, FIG. 2 is a schematic view of a step in the manufacture of the glazing unit shown in FIG. 1, and FIG. 3 is a schematic view of a step in the manufacture of a different glazing unit.

A laminated glazing unit 1 (see FIG. 1) comprises a first glazing panel 2, typically transparent float glass, a leaded second glazing panel 3 and a set, preferably transparent, resin material 4 between the panels 2 and 3. The leaded second glazing panel 3 comprises a frame 5 of lead cames 5a supporting a latticework 6 of narrower lead cames 6a, the lead cames 5a and 6a providing a framwork into which a plurality of glazing panes 7, e.g. clear or coloured stained diamond or square shaped glass panes, are cemented.

The laminated glazing unit 1 is made by firstly carefully cleaning the glazing panels 2 and 3. For the leaded second glazing panel 3 the cleaning operation, in addition to cleaning of the glazing material, also involves removal of dirt and deposits from the lead cames 5a and 6a. All the lead joints of the glazing panel 3 are then visually checked for tightness and, if any loose joints are found, these are primed with silicone material or the like.

It is also advisable at this stage of the manufacture to ensure that each pane 7 is fixed in the came framework in an at least liquid-tight, and, preferably also airtight, manner to safeguard against possible resin and air leakage during the subsequent laminating stage, which leakage would render an expensive leaded panel completely useless. If it is deemed necessary to provide liquid-tight joints for at least some or all of the panes 7, this is effected by carefully priming the joints with a silicone sealer or the like and thereafter pointing around the perimeter of the panes.

The cleaned lead cames 5a (and possibly also the lead cames 6a) are then primed with sealer. A double sided adhesive tape 9 is then applied peripherally to an upwardly facing surface of the frame 5 of the glazing panel 3 which is positioned substantially horizontally. The tape 9 is applied slightly inwardly, e.g. 2 mm, of the peripheral edge of the frame 5. The glazing panel 2 is then positioned above the glazing panel 3 in face-to-face relationship therewith and is lowered onto the tape 9 before being pressed thereagainst to ensure adhesion. The tape 9 is of sufficient thickness to ensure that the glazing panels 2 and 3 are spaced apart so as not to contact each other. If desired, the glazing panel 2 may be lowered directly onto an exposed, adhesive face of the tape 9. However, the positioning of the glazing panels is facilitated if the panel 2 is lowered onto non-adhesive release or covering paper already present on the adhesive face of the tape, the release paper being peeled off the adhesive tape 9 and the glazing panels 2 and 3 pressed firmly together after the glazing panel 3 has been accurately positioned relative to the glazing panel 2. The tape 9 between the glazing panels 2 and 3 provides a liquid-tight barrier around the peripheries of the panels 2 and 3. Alternatively it is possible to assemble the glazing panels in a face-to-face relationship by means of holding the panels apart at their peripheries with small wedges at intervals, as desired, then sealing the resultant gap with silicone or similar sealant, removing, after the sealant has set, the wedges, filling the gaps vacated by the wedges with silicone or similar sealing material and allowing this material to set before resin filling. It is also possible for perimeter sealing to use other adhesive materials such as polysulphide, butyl, polyisobutylene, hot melt materials and most materials used in the construction of double glazing units. In addition, it is possible to use solid and semi-solid materials which have a highly adhesive surface.

It is important, however, to leave a gap or opening in the peripheral seal to provide a filling opening 10 for the introduction of laminating resin material. The filling opening 10 may also serve as a hole for excavation of air during and after the introduction of the laminating material. However at least one additional or alternative air hole may be provided for this purpose. If the tape 9 is gas permeable, the air evacuation holes may be omitted.

Since the tape 9 was applied slightly inwardly of the peripheral edge of the frame, a channel shaped peripheral recess exists outwardly of the tape 9 between the glazing panels 2 and 3. This peripheral recess is now filled with a strong adhesive sealant, e.g. silicone sealant or the like, taking care not to cover the filling opening 10 (and air holes if provided). The sealant is then allowed to cure.

The assembly of spaced-apart glazing panels 2 and 3 is then supported in an inclined position (see FIG. 2) with the filling opening 10 uppermost. Typically the panels are inclined at an angle of from 15° to 65°, preferably from 20° to 40°, e.g. 30°, to the horizontal. A broad but thin spout 15 of a funnel 16 is then inserted into the filling opening 10 and previously prepared exothermically setting liquid resin material (the quantity of which has been previously calculated) is poured or injected through the funnel downwardly into the interspace 14 between the panels 2 and 3. The funnel or entry guide can be of any acceptable shape or size.

The exothermically setting liquid resin material may be any conventional liquid binder used in the manufacture of laminated safety glass. However, particularly preferred resin material is obtained by mixing, e.g. hand mixing or machine mixing methacrylate resin, (the designated resins and catalysts are manufactured by Degussa AG, and Rohmn, West Germany). The resin material is prepared by measuring out a predetermined quantity of selected resin by slowly pouring the latter into a measuring beaker and allowing it to degas sufficiently to ensure no micro bubbles are held in the basic resin. The actual rate of degassing is dependent on the temperature of the operating environment. When the selected resin is absolutely clear, and has no trapped air therein, the catalysts are slowly poured into the resin and gently but thoroughly, stirred, care being taken to ensure adequate mixing without generating air micro bubbles. If bubbles are generated during mixing, sufficient time must be allowed to elapse for them to dispense. Catalysts are added to the selected resin, suitably at ratios of from 100:1 by volume to 100:0.5 by volume. However, these ratios are only an approximate guide and can be substantially altered to affect clarity, strength and curing rate of the resin material. The resin and catalysts can also be mixed at the above ratio by special mixing machines and dispensed or injected into the entry funnel or opening. Typically the viscosity of the liquid resin material during pouring is less than 5 cSt, e.g. 3.1 cSt, at 20° C. although effective pouring can be obtained at higher viscosities of, for example, up to 25 cSt at 20° C.

The actual pouring of the prepared resin material into the interspace 14 between the panels 2 and 3 should be performed with great care to minimise the creation of air bubbles in the interspace. However, because of the construction of the leaded glazing panel 3 and the irregular contours inside the filled interspace 14, there are normally a large number of air bubbles trapped behind the lead cames. To displace these bubbles, the glazing panel assembly is raised into a vertical position and each air bubble is carefully moved or displaced by vibrating the panel assembly and by tapping the glazing panels 2, 3 at each air bubble location until all the air bubbles have been displaced to the top of the resin material. The panel assembly is then lowered into a horizontal position and air from the air bubbles is evacuated through the air holes or the filling opening 10. When all the bubbles have been evacuated, the air holes and filling opening 10 are carefully sealed with mastic. If any air bubbles remain after sealing they can be removed through the tape by means of an air vacuum pump, syringe or other well known types of air extractor.

The panel assembly is now ready in the horizontal position for curing. As a result of the varying thicknesses of resin material in the panel interspace 14 and because of the increased thickness of resin material over that normally used in resin laminating of glass using clear float glass and/or figured glass which is necessary to ensure that the glazing panel 2 is spaced from the lead cames 5a and 6a, a problem of chemical heat build up in the exothermically setting resin material occurs. Furthermore, if curing proceeds too quickly, the resin material shrinks. In order to prevent certain types of expensive and specially made glass from cracking or fracturing as a result of excess resin heat or resin shrinkage, it is necessary to prevent the panel assembly from overheating. As the curing process time is controlled by the ambient temperature of the room in which the panel assembly is stored for curing, the curing time can be determined. It has been experimentally established that by ensuring that the temperatures of the glazing panels 2 and 3 of the panel assembly are kept below 27° C. by means of air cooling or water cooling for approximately 4 hours—checking the panel assembly temperature approximately every 30 minutes—a successful resin cure can be effected without any resultant fractures or tears or damage to the leaded panel 3.

After the curing process is complete the filling opening 10 and air evacuation holes are re-sealed with silicone, finally completing the lamination.

It should be noted that where required multi-lamination on either side of the leaded panel can be effected using the method described herein.

It is possible to laminate a leaded panel in the manner described, without carrying out all the operations described, for example not cleaning the lead cames, or checking joints for air tightness, using different peripheral sealing mastic; but the quality of the finished product is uncertain and may be of an unacceptable standard. The preferred method described produces consistent quality results. It is also possible to colour clear leaded panels, by colour tinting the resin as desired before its introduction between the panels to be bonded.

In an alternative embodiment, a special resin filling funnel 20 (see FIG. 3) is left in the filling opening 10 during setting of the resin material. Such a funnel 20 is used when it is deemed that because of size and calculation of the resin, unacceptably large forces would act upon the leaded glass panel. In this case the resin material is poured through the funnel 20 to fill the interspace 14 and also partly to fill the funnel 20 and the panel assembly is left in a resin setting position. This enables the introduced resin material, when beginning expansion on the commencement of the cure, to push surplus resin material up or out of the funnel 20, removing any stress on particularly the leaded glass panel. Similarly when the resin curing progresses, contraction begins and the required amount of resin is then drawn back into the funnel via the filler, again minimising any stress. When this phase has been completed, the funnel 20 is removed and the filling opening 10 is sealed. This method of allowing the resin material to expand and contract freely, is only possible with resin material, such as the methacrylate resin described herein, which will not cure when exposed to air, therefore permitting free rise and fall within the expansion filler or funnel.

Arising from the lamination of leaded glass panels, it is now possible, for the first time, to successfully manufacture a leaded glass double glazing unit to an acceptable standard. The construction and benefits. of double glazing units are well known, particularly as disclosed in GB-B-2077834. However, because of the flexing, expansions and contraction of the laminated leaded panel in a double glazed unit, when exposed to extreme temperatures, the construction of the double glazed unit must be to a very high standard as, for example, disclosed in GB-B-2077834. The construction of a double glazed until with a laminated or leaded panel can be carried out in two ways. Firstly, the face of the laminated panel having the smooth or float glass surface can be constructed with the float glass face innermost, as in a normal manufacture of a double glazed unit. This has the advantage that it presents the leaded face inside to the building. This would be desirable in most instances. However, where the leaded face faces into the cavity of the unit, by reason of inaccessibility for cleaning or such like, the leaded face can be successfully sealed innermost in a double glazed unit. However, this requires very high standards of construction and performance of sealants such as described in GB-B-2077834. It is preferable that a primary seal, e.g. of polyisobutylene, is used in construction with preferably a sealant which will permit maximum flexing of the laminated leaded or stained glass panel, therefore minimizing the possibility of a cracked pane in the leaded panel, or the clear laminated pane.

A number of manufactured laminated leaded glass panels have been incorporated in double glazed test units assembled according to GB-B-21077834, with the leaded face outwards. These test units were tested in West Germany to the German DIN Standard No. 52,344 and all the test units successfully passed the test ensuring their suitability for all climates and conditions.

The invention has heretofore been described with reference to leaded glazing units. However, it is also applicable to laminating or resin bonding stained or decorative glass.

Stained glass normally comprises clear or coloured glass having a picture or design painted, stained or transferred into the glass and subsequently fired or fused into or onto the glass. Such stained glass can be incorporated, but not always, in a leaded panel. Some imitation stained panels are only painted onto the surface without further heat or light exposure treatment, to provide permanecy. Stained glass or imitation stained glass panels can also be constructed or manufactured as mock leaded panels by applying adhesive imitation lead cames to one or both faces of the stained or imitation stained panels in a design or pattern to suit the pictorial element. A leaded effect can also be achieved by fusing suitable materials onto clear or obscure glass or by simply painting the glass to effect a leaded design. Similarly clear glass can have the mock lead adhesive cames applied to either or both faces to provide a mock clear leaded panel. All these types of panels can be laminated or resin bonded in a similar manner to that described.

Decorative glass normally has a design or pictorial scene, formed thereon by, for example sandblasting, acid etching or embossing screen printing or print or picture transfer. In this way designs, such as floral or other patterns, pictorial scenes or repetitive designs are formed over the glass. All glass which has been sandblasted, acid etched or had various types of print or picture transferred thereon, must be treated before laminating or resin bonded in the manner described. Whereas in the laminating of stained and most imitation stained glass panels the resin has no effect on the colour portions of the panel, on a decorative panel as described above the resin has the visual effect of making the design or pattern semi-translucent or clear which is unacceptable. Some painted, e.g. hand painted, designs, such as lettering, or painted or filled in gold leaf backed with varnish or quick drying fixative, are unaffected. However, the white or semi-translucent design formed, for example, by sandblasting, acid etching or transfer printing, require to be treated by providing a barrier to prevent the resin contacting the white or treated glass. This can be achieved by rubbing or grinding in of powdered pumice or white powder and applying a quick drying fixative prior to laminating, or any primer or barrier coating, which will protect and maintain the desired design translucency of the acid embossed or sandblasted decoration, until the resin has cured.

Many modifications and variations to the described invention will be apparent to those skilled in the art and it is intended that, within the scope of the ensuing claims, the invention may be practised otherwise than as specifically described herein.

I claim:

1. A method of producing a laminated leaded glazing unit comprising:

arranging a first glazing panel in a spaced apart confronting relationship with a leaded second glazing panel having glazing panes held together;

introducing an exothermically setting liquid resin material between the first and second glazing panels;

preventing leakage of the introduced liquid resin material prior to the liquid resin material becoming set and including sealing the spaced apart first and second glazing panels together around at least a part of their peripheries in a liquid-tight manner and by sealingly holding the glazing panes together in a liquid-tight manner by cames; and thereafter allowing the liquid resin material to set.

2. A method according to claim 1, in which the liquid resin material comprises methacrylate resin material.

3. A method according to claim 1, comprising arranging the first and second glazing panels at an angle to the horizontal during introduction of the liquid resin material between the panels through an unsealed upper portion of the periphery of the glazing panels, the glazing panels being subsequently moved into a substantially horizontal position to enable air to be expelled from between the panels and liquid resin material to set.

4. A method according to claim 3, in which the first and second glazing panels are peripherally sealed by gas-permeable strip material sandwiched between the peripheries of the first and second glazing panels and in which said unsealed upper peripheral portion is sealed prior to moving the glazing panels into said substantially horizontal position.

5. A method according to claim 3, in which the first and second glazing panels are peripherally sealed by strip material, which is at least substantially impervious to gas passing through, sandwiched between the peripheries of the first and second glazing panels, in which said unsealed upper peripheral portion is sealed, apart from the provision of at least one air gap, prior to moving the glazing panels into said substantially horizontal position and in which said at least one air gap is subsequently sealed when the air has been expelled from between the glazing panels with the glazing panels in said substantially horizontal position.

6. A method according to claim 5, in which silicone sealing material is applied outwardly of the strip material.

7. A method according to claim 1, in which the first and second glazing panels are peripherally sealed with double-sided adhesive strip material sandwiched between the glazing panels.

8. A method according to claim 1, in which the leakage preventing includes sealingly holding together the glazing panes with the cames formed as lead cames.

9. A method according to claim 8, comprising cleaning and/or priming the lead cames with a primer or bonding agent prior to arranging said first and second glazing panels in face-to-face relationship.

10. A method according to claim 1, in which the leakage preventing includes sealingly holding together the glazing panes with the cames formed as imitation lead cames.

11. A method according to claim 1, comprising cooling the glazing panel assembly during setting of the liquid resin material.

12. A method according to claim 1, including inserting a filling funnel for resin material between the first and second glazing panels, introducing the liquid resin material between the glazing panels via said funnel, and removing the funnel from between the glazing panels after expansion and contraction has occurred of the liquid resin material during the resin setting process.

13. A laminated glazing unit produced by the method claimed in claim 1.

14. A method according to claim 1, in which the leakage preventing includes sealingly holding together the glazing panes with the cames in an air-tight manner so as to prevent air leakage.

* * * * *